Jan. 17, 1967 E. E. ERIKSSON ETAL 3,299,282

COMPARATOR CIRCUIT USING A TRANSISTOR GATED BLOCKING OSCILLATOR

Filed Jan. 15, 1963

INVENTORS
ELOF ERIK ERIKSSON
SVERRE GEORGE SEM-SANDBERG

United States Patent Office 3,299,282

Patented Jan. 17, 1967

3,299,282

COMPARATOR CIRCUIT USING A TRANSISTOR GATED BLOCKING OSCILLATOR

Elof Erik Eriksson, Bandhagen, and Sverre George Sem-Sandberg, Vendelso, Sweden, assignors to Telefonaktiebolaget L M Ericsson, Stockholm, Sweden, a corporation of Sweden Filed Jan. 15, 1963, Ser. No. 251,669
Claims priority, application Sweden, Jan. 19, 1962, 575/62
2 Claims. (Cl. 307—88.5)

The present invention refers to a comparator circuit or a discriminator for comparing a varying potential with a reference potential and producing in dependence on the comparison result an output signal if the varying potential is equal to or greater than (or less depending on the transistor-type used) the value of the reference potential in an arbitrary moment.

Comparator circuits of different type are generally known. In a known type a regenerative amplifier or a blocking oscillator is used consisting of a transistor and a transformer, the primary winding of which is connected to the base circuit or the emitter circuit of the transistor. The base receives the varying potential but it is held normally blocked by means of a suitable potential through a diode. The blocking potential is periodically nullified by means of gate pulses which are blocking the diode, and during the presence of the pulse the base receives only the varying potential. Depending on the fact whether the transistor is of the pnp- or of the npn-type, the transistor will be conducting if the varying potential is less or greater respectively than the reference potential and a pulse-shaped signal is obtained from the output of the regenerative amplifier.

A drawback of comparator circuits of this type consists therein that due to a certain capacitance between the base and ground and due to the fact that the diode is not ideal but has a certain capacitance, the gate pulse does not have an ideal shape and will consequently influence the potential received on the base. An object of the invention is to eliminate this drawback and to provide a comparator circuit in which the potential of the gate pulses does not influence the comparison result, and the base of the transistor only receives the varying potential which is to be compared with the reference potential.

This object and other objects are obtained according to the invention in such a manner that control of the regenerative circuit is carried out through its output circuit. The circuit comprises a transistor or the like, the conducting condition of which is defined by control pulses fed to the base so as to allow during the presence of the control pulse, regeneration in the amplifier, if the varying potential is less than (or greater than, depending on the transistor-type) the reference potential.

Figure 1:
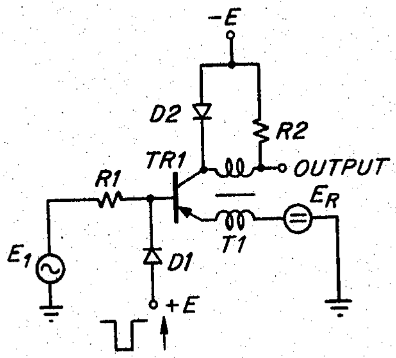

The invention will be explained more in detail by means of an embodiment with reference to the enclosed drawing. FIG. 1 shows a circuit of previously known type, FIG. 2 is a diagram showing the variation of the potential on the base of the circuit arrangement according to FIG. 1, and FIG. 3 shows a circuit according to the invention.

In FIG. 1, TR1 designates a transistor which together with the transformer T1 constitutes a regenerative amplifier or blocking oscillator. To the base of the transistor is connected to the source of the varying potential E1 through a resistance R1. Diode D1 connects a source of positive potential +E to the base of the transistor in such a manner that normally a direct current is passing through the diode. The emitter of transistor TR1 is connected via the secondary winding of transformer T1 to the source of reference voltage $E_R$. Consequently, sense transistor TR1 is of the pnp-type, the base of the transistor has substantially the same potential as the potential source and the transistor is blocked. If a negative pulse is fed to the diode D1, the diode is blocked and the base of transistor TR1 is responsive to the potential of the varying potential E1. In the case where the varying potential is lower than the reference potential E1 during the duration of the gate pulse, the transistor becomes conducting, in the opposite case it will be blocked. The primary winding of transformer T1 is connected to the collector circuit of the transistor in series with a resistance R2 which is connected to a negative potential source −E. A diode D2 constitutes a parallel branch between the collector and said potential source E. When the transistor becomes conducting, a pulse-shaped potential is obtained in consequence of the usual blocking oscillator regenerative process on the output of the circuit, that is, the connecting point between the resistance R2 and the primary winding of the transformer.

Figure 2:
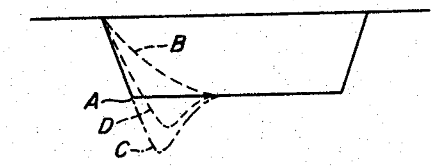
Figure 3:
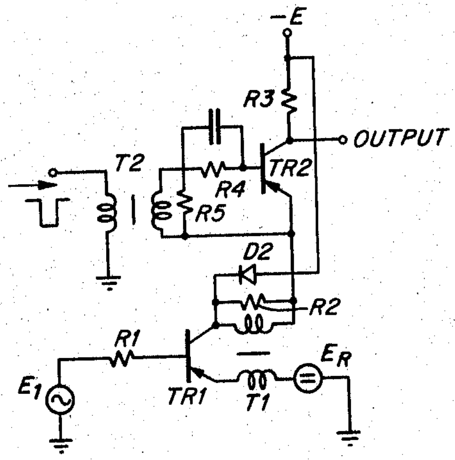

As mentioned in the introduction, the base of the transistor does not only receive the varying potential E1 which is to be compared with the reference potential $E_R$ but also receives a potential due to the fact that the shape of the gating pulse is not as it theoretically should be, as shown by the line A in FIG. 2. Because of a certain capacity between the base terminal and ground, the pulse will be an exponential function having the time constant $R_1C$ as shown by means of the curve B. Since the diode D1 is not ideal but has a small shunt capacitance, the pulse potential may, on the other hand, have the shape shown by the curve C, so that the resulting potential has a shape shown, for example by the curve D, and an incorrect comparison result can be obtained.

In order to eliminate such a source of error the gating control is not carried out through the base circuit of the transistor but through its collector circuit, so that the base of the transistor always receives the exact varying potential. Accordingly, the intention contemplates a further transistor TR2 connected to the collector circuit of the transistor TR1, which collector circuit is the output circuit of the regenerative amplifier, in such a manner that a signal can be obtained from the output circuit only when the transistor TR2 is conducting, see FIG. 3. The base-emitter circuit of the transistor TR2 comprises the secondary winding of a transformer T2, the primary winding of which is fed by gate pulses in such a manner that owing to the gate pulse the base will become more negative than the emitter and the transistor TR2 will become conducting. Consequently, the regeneration process begins in the regenerative amplifier if the varying potential is less in value than the reference potential, so that a pulse-shaped signal is obtained from the collector of the transistor TR2, forming the output of the circuit.

The output pulse will have a waveform similar to an exponential function, the time constant of which is defined by the resistance R3 which is connected to the collector circuit and by the inductance of the transformer T1. As it seems the base potential of the transistor TR1 will only depend on the potential which is to be compared and the correctness of the comparison is not influenced by any other factors. The gate frequency and the pulse-pause relation of the gate pulse cannot be varied of course within too wide limits when having a certain dimensioning. Assuming that the capacitive coupling between the windings of T2 is small, the gate pulse will not influence the operation level of the comparison circuit.

The invention is evidently not limited to the shown embodiment and instead of, for example, pnp-transistors npn-transistors, may be used without leaving the scope of the invention.

We claim:

1. Apparatus for comparing a varying potential with a reference potential, comprising: a regenerative amplifier including a first transistor having an emitter, a collector and a base terminal, and a first transformer having a primary winding and secondary winding, said base terminal being adapted to receive the varying potential, one end of said secondary winding being connected to said emitter terminal, the other end of said secondary winding being adapted to receive said reference potential, one end of said primary winding being connected to said collector terminal; a gated amplifier including a second transistor having an emitter, a collector and a base terminal, control means connected to said base terminal and adapted to receive signals for rendering said second transistor controllably conductive; means for connecting the other end of the primary winding of said first transformer to the emitter terminal of said second transistor; a source of operating potential different from said reference potential connected to the collector terminal of said second transistor, whereby when the varying potential is different from said reference potential while said second transistor is conductive, a pulse signal is transmitted from the collector terminal of said second transistor.

2. The apparatus of claim 1, wherein said control means comprise a second transformer including a primary winding and a secondary winding, said primary winding being adapted to receive the signals for rendering said second transistor controllably conductive, and means for connecting said secondary winding between the emitter and base terminals of said second transistor.

References Cited by the Examiner

UNITED STATES PATENTS

| | | | |
|---|---|---|---|
| 2,924,786 | 2/1960 | Tallsin et al. | 331—112 |
| 2,955,213 | 10/1960 | Schaeve | 307—88.5 |
| 3,002,110 | 9/1961 | Hamilton | 331—112 X |
| 3,033,996 | 5/1962 | Atherton | 307—88.5 |
| 3,048,715 | 8/1962 | Horton | 307—88.5 |
| 3,080,488 | 3/1963 | Sem-Sandberg | 307—88.5 |
| 3,178,583 | 4/1965 | Koch | 307—88.5 |

ARTHUR GAUSS, *Primary Examiner.*

J. JORDAN, *Assistant Examiner.*